US005654047A

United States Patent [19]

Watanabe et al.

[11] Patent Number: 5,654,047

[45] Date of Patent: Aug. 5, 1997

[54] EXPLOSION-PROOF PORCELAIN HOUSINGS FOR GAS-FILLED INSULATING APPARATUSES AND PROCESS FOR PRODUCING SUCH PORCELAIN HOUSINGS

[75] Inventors: Akihiro Watanabe, Hashima; Keiichi Asai; Yasunori Matsuura, both of Kasugai; Nagahiro Kawano, Kurume; Masafumi Sugi, Yame, all of Japan

[73] Assignee: NGK Instulators, Ltd., Nagoya, Japan

[21] Appl. No.: 801,470

[22] Filed: Dec. 2, 1991

[30] Foreign Application Priority Data

Nov. 30, 1990 [JP] Japan .................................. 2-340785

[51] Int. Cl.$^{6}$ .................................................. B32B 21/00

[52] U.S. Cl. ...................... 428/34.4; 428/34.6; 428/34.7; 428/35.7; 428/35.9; 428/36.8; 428/212; 428/217; 428/425.6; 428/448; 428/451; 428/493; 428/516; 428/518; 174/137 A; 174/137 B

[58] Field of Search ................................ 428/34.4, 34.6, 428/34.7, 448, 493, 451, 516, 518, 447, 36.8, 212, 217, 425.6; 174/137 A, 137 B

[56] References Cited

U.S. PATENT DOCUMENTS

| | | | |
|---|---|---|---|
| 4,091,124 | 5/1978 | Reighter | 428/413 |
| 4,177,322 | 12/1979 | Homan | 428/391 |
| 4,476,155 | 10/1984 | Niemi | 174/137 A |
| 4,749,824 | 6/1988 | Orbeck | 428/447 |
| 4,940,613 | 7/1990 | Golino | 428/34.7 |
| 5,011,717 | 4/1991 | Moriya | 428/34.4 |
| 5,234,713 | 8/1993 | Watanabe | 427/233 |

FOREIGN PATENT DOCUMENTS

| | | | |
|---|---|---|---|
| 0 053 363 | 6/1982 | European Pat. Off. . | |
| 0 350 289 | 1/1990 | European Pat. Off. . | |
| 61-151909 | 7/1986 | Japan . | |
| 61-264612 | 11/1986 | Japan . | |
| 616265 | 3/1980 | Switzerland . | |
| 9119606 | 12/1991 | WIPO | 428/34.7 |

OTHER PUBLICATIONS

Webster's Ninth New Collegiate Dictionary, Merriam–Webster, Inc., p. 166, Jan. 1990.

*Primary Examiner*—Ellis Robinson
*Assistant Examiner*—Timothy M. Speer
*Attorney, Agent, or Firm*—Parkhurst, Wendel & Burr, L.L.P.

[57] ABSTRACT

An explosion-proof porcelain housing for use in a gas-filled insulating apparatus, comprising a porcelain housing body, and a first and second films. The first film is made of a first insulating material having low hardness and high elasticity, and is bonded to an inner surface of the porcelain housing body. The second film is made of a second insulating material having high hardness and high mechanical strength, and is bonded to an inner surface of the first film. A process for producing such an explosion-proof porcelain housing is also disclosed.

9 Claims, 4 Drawing Sheets

EXPLOSION-PROOF PORCELAIN HOUSINGS FOR GAS-FILLED INSULATING APPARATUSES AND PROCESS FOR PRODUCING SUCH PORCELAIN HOUSINGS

BACKGROUND OF THE INVENTION

1. Field of the Invention

The present invention relates to explosion-proof porcelain housings for gas-filled insulating apparatuses, and a process for producing such porcelain housings. More particularly, the invention relates to explosion-proof porcelain housings for gas-filled insulating apparatuses, which is adapted to prevent broken pieces thereof from being scattered if the porcelain housing is broken due to the pressure of a gas inside the gas-filled insulating apparatus. The invention also relates to a process for producing such explosion-proof porcelain housings.

2. Related Art Statement

For attaining the above purpose, explosion-proof porcelain housings in which a film made of an insulating material formed on an inner surface of a porcelain housing body are formerly known. A typical porcelain housing includes a single layer of a synthetic resin or an elastomer bonded to an inner surface of a porcelain housing body.

However, as to this explosion-proof porcelain housing having a single film layer bonded thereto, as shown in FIG. 3, when the porcelain housing body 11 is cracked for some reason, an internal pressure is abruptly applied to circumferentially expand the film 12 at a cracked portion. That is, since the film 12 is bonded to the porcelain housing body 11, circumferential stresses are concentrated on the outer side surface of the film 12 at the cracked portion 13 of the porcelain housing body 11. The distribution of circumferential stresses is shown in FIG. 3. Since the film 12 is readily torn by this concentration of the stresses, a sufficient explosion-proof effect cannot be obtained.

In order to solve the defects of such a conventional explosion-proof porcelain housing having a single film integrated with the porcelain housing body, NGK Insulators, Ltd. formerly developed an explosion-proof porcelain housing in which films made of two kinds of materials, respectively, are formed on an inner surface of a porcelain housing body in a non-bonded state as shown in Japanese patent application Laid-open No. 61-264,612. However, if such an explosion-proof porcelain housing is cracked due to some cause, since neither film is bound to the porcelain housing body, the internal pressure acts upon the entirety of the films. As a result, the film expands in the form of a balloon, such that the films are stretched and become thinner. Since intensity of stresses occurring in the film due to the internal pressure are proportional to the diameter, and are inversely proportional to the thickness, the films are further expanded with the stresses and are finally broken. In addition, since neither film is bonded to the porcelain housing body, broken pieces of the porcelain housing body are scattered in all directions. Therefore, sufficient explosion-proof effect cannot be expected.

SUMMARY OF THE INVENTION

It is an object of the present invention to solve the above-mentioned problems possessed by the related art, and to provide an explosion-proof porcelain housing for a gas-filled insulating apparatus, which porcelain housing can suppress to a minimum the scattering of broken pieces of the porcelain housing if the porcelain housing is broken by some cause, and also to provide a process for producing such an explosion-proof porcelain housing.

For attaining the above-mentioned object, the present invention relates to the explosion-proof porcelain housing for use in a gas-filled insulating apparatus, comprising a porcelain housing body, a first film bonded to the inner surface of the porcelain housing body, and second film bonded to the inner surface of the first film, wherein the first film is made of a first insulating material having low hardness and high elasticity, and said second film is made of a second insulating material having high hardness and high mechanical strength.

The present invention also relates to the process for producing such an explosion-proof porcelain housing for use in the gas-filled insulating apparatus, comprising steps of: preparing a porcelain housing body, lining a first insulating material having low hardness and high elasticity onto an inner surface of the porcelain housing body while rotating the porcelain housing body, and lining a second insulating material having high hardness and high mechanical strength onto an inner surface of the first insulating material, thereby forming two layers of lining consisting of first and second films on the inner surface of the porcelain housing body.

According to the present invention, it is preferable that JIS-A hardness and elongation of the first film are 55~80 and not less than 400% (more preferably 400% –700% ),respectively, JIS-A hardness and tensile strength of the second film are preferably 85–95 and not less than 150 $kgf/cm^2$ (more preferably 400–700 $kgf/cm^2$), respectively.

Further, it is preferable that the hardness of the first film is lower than that of the second film by not less than about 20 to about 30 in terms of JIS-A hardness.

Furthermore, the thickness of the first film is preferably about 1 mm to about 2 mm.

Moreover, it is preferable that when the inner diameter of the porcelain housing body is as small as about 100~150 mm, tensile strength of the second film is set at not less than 150 $kgf/cm^2$, desirably 400–700 $kgf/cm^2$, and a thickness of the second film is a few mm to dozens mm.

In addition, it is preferable that the inner diameter of the porcelain housing body is as large as about 400~600 mm, tensile strength of the second film is 400 to 700 $kgf/cm^2$, and a thickness of the second film is a few mm to dozens mm.

Further, it is preferable that the second film is made of an arc-resistive material or the inner surface of the second film is lined with an arc-resistive material.

Furthermore, it is preferable that the first and second films are made of materials selected from the group consisting of polyurethane resin, natural rubber, silicon rubber, butyl rubber, ionomer resin, polypropylene, polyethylene, ethylene-vinyl acetate copolymer, styrene-butadiene resin, and glass fiber-reinforced materials thereof.

The thus constituted explosion-proof porcelain housing according to the present invention is arranged such that the porcelain housing is attached to the gas-filled insulating apparatus (e.g. a gas bushing) in which an insulating gas is filled at high pressure. If the porcelain housing body is broken by some cause, the first film is torn along a crack of the porcelain housing. However, since hardness and strength of the second film are greater than those of the first film, progression of tear is stopped by the second film.

In this case, the lining layers consisting of the first and second films tends to be expanded with an internal pressure. However, since the porcelain housing body and the first film as well as the first film and the second film are bonded together, the lining layer is expanded mainly at a cracked portion of the porcelain housing body, and not long the remaining portion.

Therefore, the porcelain housing will not self-destruct, following expansion, as prior devices do due to in diameter, reduction in thickness of the lining, increase in stresses, and further expansion of the lining as discussed above. Since the first film is made of the insulating material having high elasticity, stresses occurring in the second film are mitigated through expansion of the first film 2 at the cracked portion of the porcelain housing body. Consequently, maintenance of strength proportional to the initial thickness of the second film can be expected.

Further, since the second film is made of insulating material having high hardness and high mechanical strength, a considerably high internal pressure is necessary for tearing the second film. Even if the second film is partially torn, the tear will be prevented from easily propagating by mitigation of stresses acting upon the second film at the cracked portion of the porcelain housing body, since the first film bonded to the second film. Thus, since the gas inside the porcelain housing body is gradually discharged through the partial tear of the second film during the mitigation of the stresses, explosion and scattering of broken pieces of the porcelain housing body can be prevented.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of the claims appended hereto.

BRIEF DESCRIPTION OF THE DRAWINGS

For a better understanding of the invention, reference is made to the attached drawings, wherein.

DETAILED DESCRIPTION OF THE PREFERRED EMBODIMENTS

The present invention will be explained in more detail with reference to FIG. 1.

Figure 1:
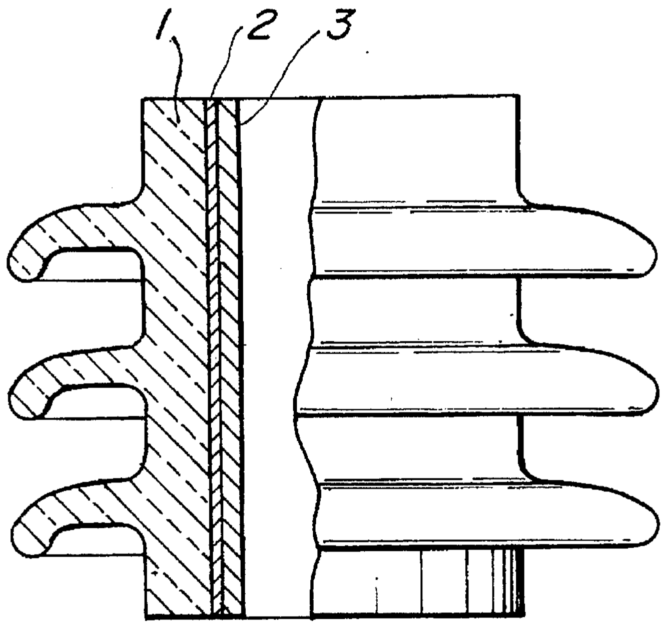
FIG. 1 is a vertically sectional view of an explosion-proof porcelain housing as one embodiment of the present invention.
Figure 2:
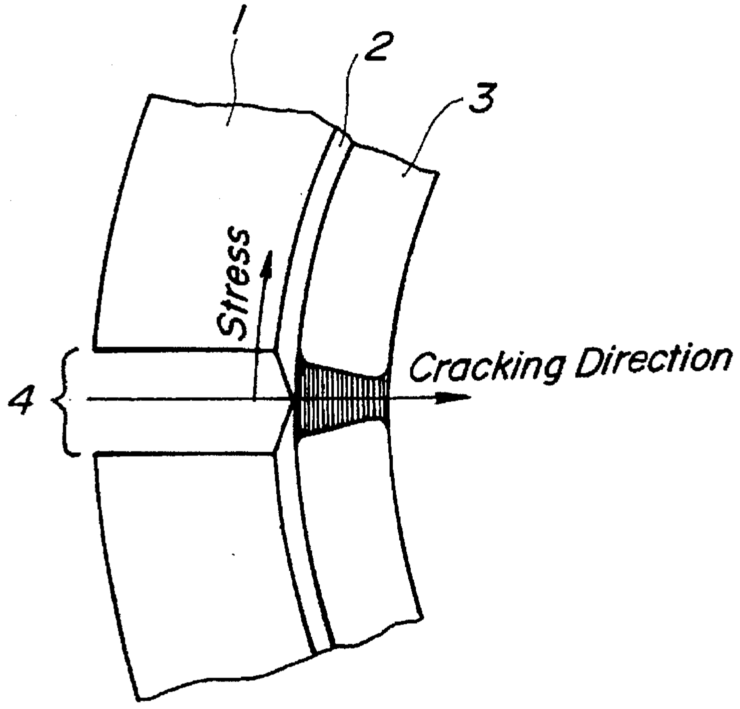
FIG. 2 is a horizontally sectional view illustrating a cracked portion of the explosion-proof porcelain housing in FIG. 1.
Figure 3:
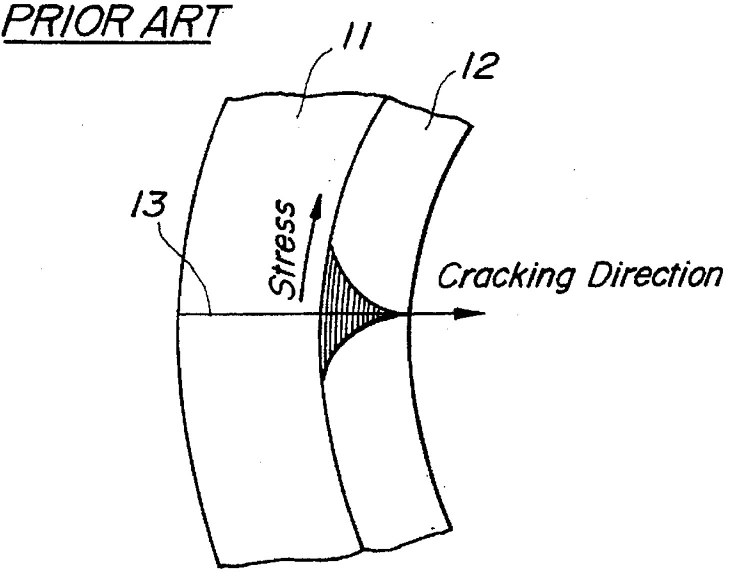
FIG. 3 PRIOR ART
FIG. 3 is a horizontally sectional view illustrating a cracked portion of the conventional explosion-proof porcelain housing having a single film layer.

In FIG. 1, a first film 2 is formed on the inner surface of a porcelain housing body 1 made of a porcelain, and a second film 3 is formed on an inner surface of the first film.

The first film 2 is made of a first insulating material having low hardness and high elasticity, and for example, a soft polyurethane resin is used as the first insulating material. "Soft" means "low hardness". The second film 3 is made of a second insulating material having higher hardness and higher mechanical strength as compared with the first film, for example, a hard polyurethane resin. "Hard" means "higher mechanical strength". The first film 2 is bonded to the inner surface of the porcelain housing body 1 with an appropriate adhesive, which can be easily selected by the skilled person in the art based on the kinds of the materials used for the porcelain housing body and the first film. The second film is directly bonded to the first film 2 without interposing an adhesive therebetween.

In order to form these two film layers on the inner surface of the porcelain housing body 1, the first film is formed on the inner surface of the porcelain housing body having an adhesive coated thereon, by flowing the soft polyurethane resin along the inner surface of the porcelain housing 1 under rotation, and then the second film is formed by similarly flowing the hard polyurethane resin directly onto the inner surface of the first film in the state that the first film is in an active condition. In order to form the first film, a liquid mixture of a main liquid ingredient and a curing agent is flowed down along the inner surface of the housing body through a pouring hose, and the housing body is rotated until the mixture loses flowability (is gelled) but still keeps its active condition. After the first layer is gelled, the second layer is similarly lined thereon.

As to the material for the porcelain housing body, any appropriate ceramic material can be easily selected by the skilled person in the art based on the intended use, the size, etc. of the porcelain housing body.

Now, the relationship between the explosion-proof effect of the porcelain housing and the thickness or the hardness of the film will be explained based on specific examples.

Figure 4:
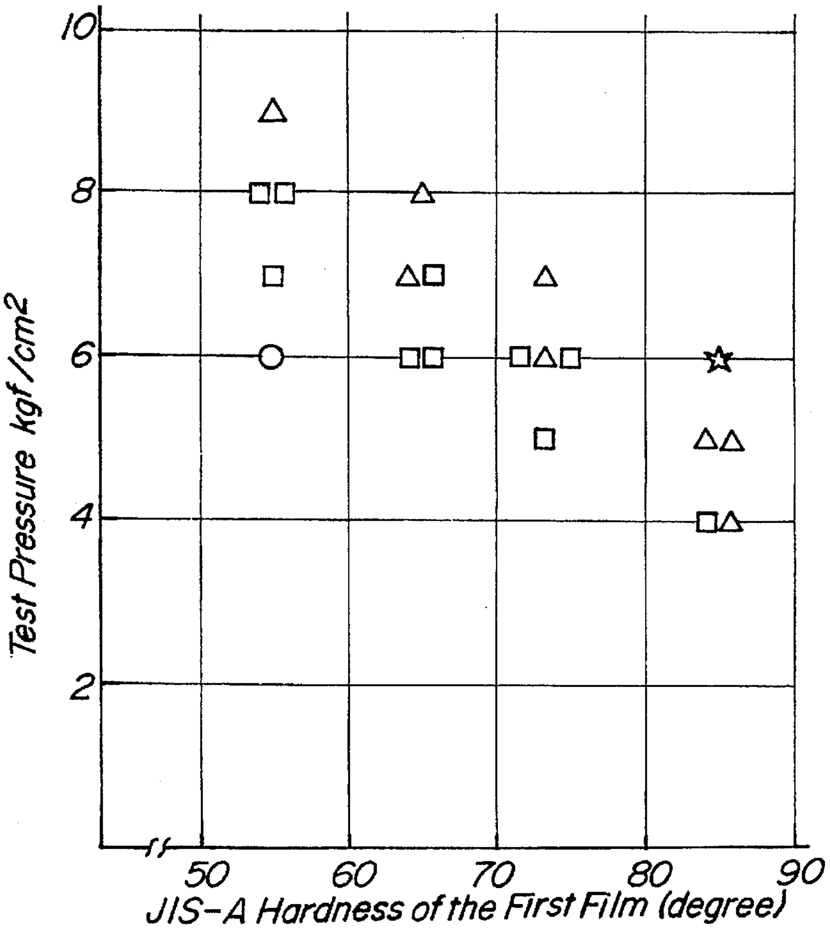
FIG. 4 is a graph showing the relationship between the hardness of the first film and the explosion-proof performance.

FIG. 4 shows results in explosion tests in which hardness of the first film was changed. The tests were conducted as follows:

First and second films made of polyurethanes having various thicknesses and hardness shown in Table 1 were lined on the inner surface of a porcelain housing body made of a conventional porcelain and having an inner diameter of 110 mm and an entire length of 460 mm, and a compressed insulating gas was sealingly filled into the porcelain housing body. A part of the porcelain housing body was broken by hitting a barrel portion of the housing body with a hammer having an acute tip, and the state of the films and the scattered state of broken pieces of the porcelain housing body were observed. In FIG. 4, symbols ○, □, Δ and ☆ denote the following meanings: ○: The films were not torn, and no broken pieces of the porcelain housing body were scattered. □: A part of the films was slightly torn, and no broken pieces were scattered, although gas was gradually discharged. Δ: A part of the films were largely torn, so that the gas was instantly discharged, and most of broken pieces were scattered. ☆: The films were greatly torn, so that the gas was instantly discharged, and a most of the broken pieces were scattered.

According to FIG. 4, when the hardness of the second film was 90 and the hardness of the first film was set at 73, some effect was recognized. When the hardness of the first film was 55, a conspicuously improved effect could be recognized.

TABLE 1

| | | | | | Stress at low expansion (Kgf/cm²) | |
|---|---|---|---|---|---|---|
| Film | Polyurethane Nos. | Thickness (mm) | JIS-A hardness (degree) | Tensile strength (Kgf/cm²) | 100% expansion | 300% expansion |
| First film | 1 | 1.5 | 55 | 120 | 10 | 20 |
| | 2 | 1.5 | 65 | 150 | 20 | 35 |
| | 3 | 1.5 | 73 | 170 | 28 | 50 |
| | 4 | 1.5 | 85 | 200 | 50 | 90 |
| Second film | 5 | 9.0 | 90 | 450 | 90 | 180 |

Figure 5:
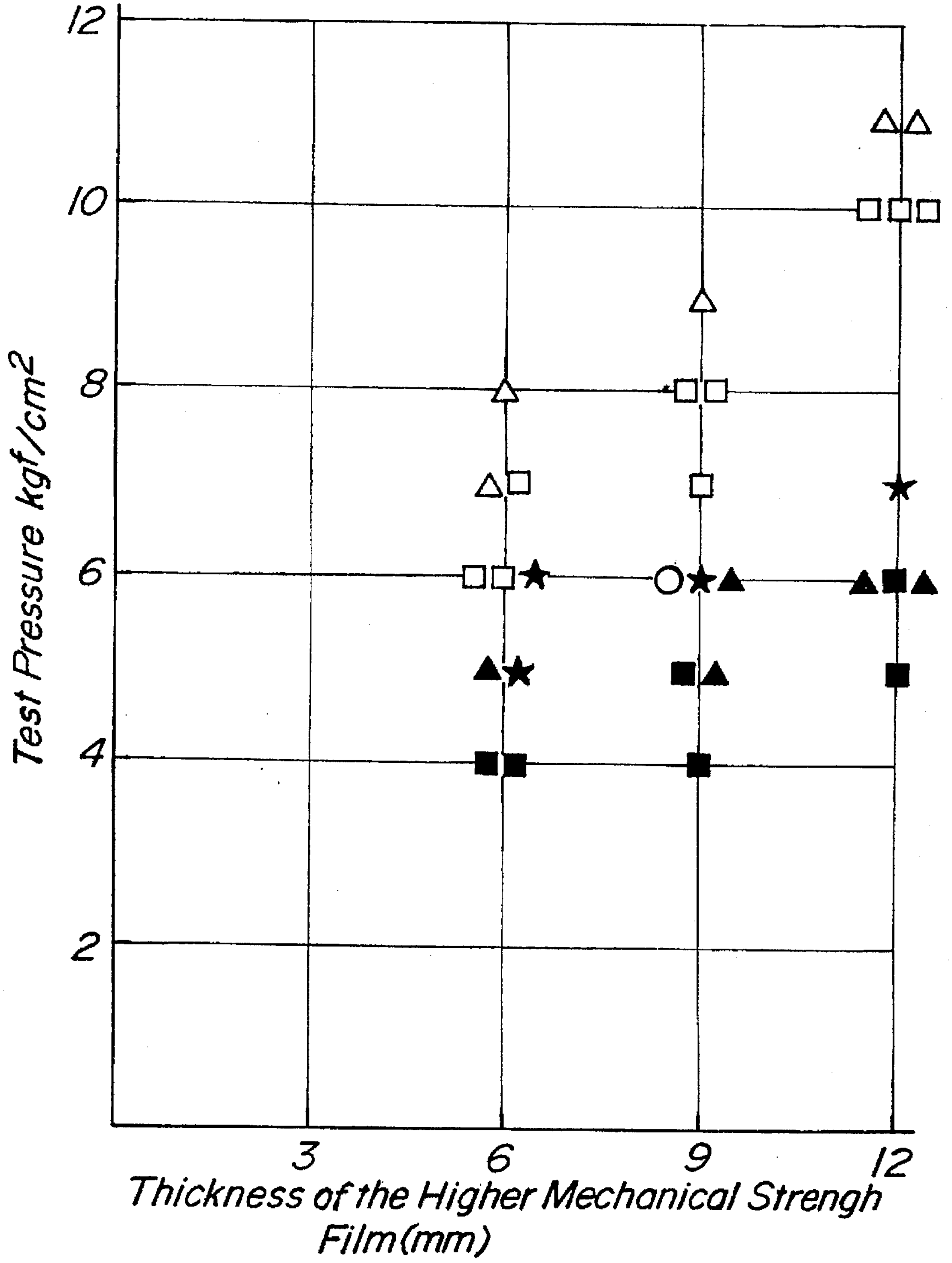
FIG. 5 is a graph showing the relationship between the thickness of the film and the explosion-proof performance.

FIG. 5 is a graph showing results in explosion tests with respect to porcelain housings in which the thickness of the second film was changed. In the porcelain housings as examples of the present invention, a porcelain housing body was lined with two layers of the polyurethane Nos. 1 and 5 shown in Table 1 as first and second films, respectively, while the thickness of the second film was changed. The thickness of the first film was 1.5 mm. In the porcelain housings as comparative examples, the second film No. 5 shown in Table 1 was lined, while the thickness thereof was changed. The explosion tests were conducted in the same manner as mentioned before.

In FIG. 5, symbols ○, □, Δ and ☆ denote the same meanings as in FIG. 4 with respect to the porcelain housings with the two lining layers, and symbols ●, ■, ▲ and ★ have the same meanings as in FIG. 4 with respect to the porcelain housings with a single lining layer of higher mechanical strength.

From those test results, it is seen that the explosion-proof performance of the porcelain housings with the two lining layers is improved substantially in proportion to increase in the thickness of the second film. On the other hand, with respect to the porcelain housings having a single lining layer, it is seen that the explosion-proof performance cannot be greatly improved even when the thickness of the film is increased. It is believe that this result is due to stresses being concentrated at the cracked portion, as mentioned above.

Figure 6:
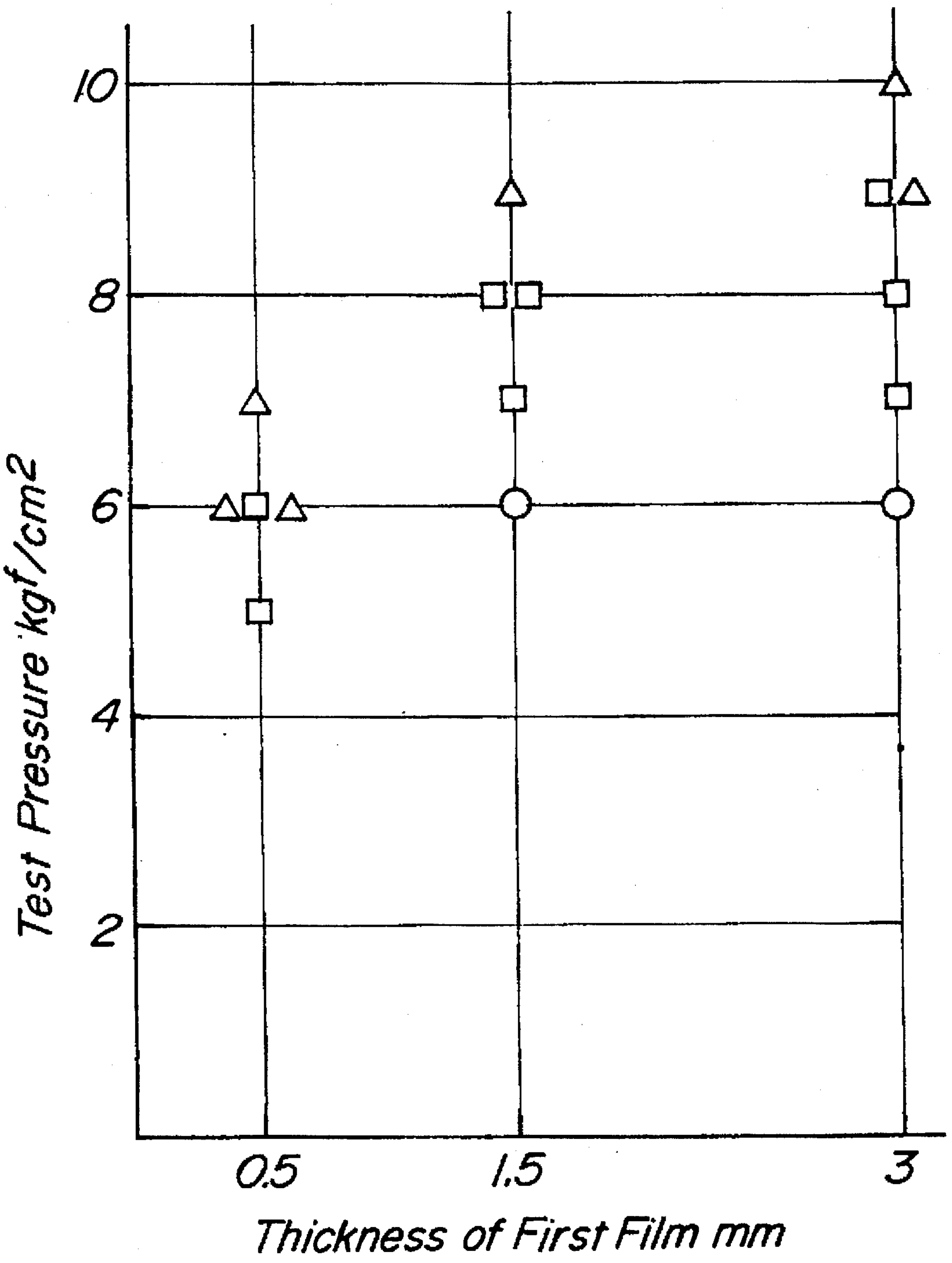
FIG. 6 is a graph showing the relationship between the thickness of the first film and the explosion-proof performance.

FIG. 6 is a graph showing results of tests in which a preferable thickness range of the first film was confirmed by varying the thickness of the first film. According to the results, it is seen that preferable effect could be attained when the thickness of the first film is at least about 1.5 mm.

From the above experiments, the following are seen.

When the hardness of the first film is lower than that of the second film by about 20 to about 30 in terms of JIS-A hardness and the thickness of the first film is 1 to 2 mm, the explosion-proof performance of the porcelain housing having the two lining layers can be greatly improved as compared with the porcelain housing having a single lining layer.

The tensile strength of the second film can be appropriately set depending upon the diameter or the internal pressure of the porcelain housing body. For example, when the internal pressure of the porcelain housing body is set at 3 to 6 kgf/cm² ordinarily employed in the gas-filled insulating apparatus, the scattering of the broken pieces of the porcelain housing body can be prevented by using the second film having a thickness of a few mm to dozens mm and tensile strength of not less than 150 kgf/cm² (up to 700 kgf/cm² tensile strength was experimentally confirmed acceptable, although no upper limit is set) in the case of the diameter of the porcelain housing body being as small as 100–150 mm. Tensile strength of not less than 400 kgf/cm² (the maximum tensile strength of actual materials is considered to be around 100 kg/cm², although no upper limit is set) is preferable in the case of the diameter is as large as 400–600 mm.

In this way, the present invention can be applied to the large diameter explosion-proof porcelain housing having high internal pressure by appropriately selecting hardness, strength, etc. of the first and second films, whereby excellent explosion-proof effect can be obtained.

Further, when the second film is made of an arc-resistive material, the porcelain housing having both explosion-proof performance and arc resistance can be obtained. The arc-resistive materials are well known to the skilled person in the art, and an appropriate one can be easily selected. For example, a polyester-based polyurethane elastomer may be used as an arc-resistive material. Experimentation revealed that although an arc current of 6 to 21 KA was passed through a porcelain housing provided with first and second films made of the above polyurethane and a polyester-based polyurethane elastomer, respectively, for a duration of 0.1–0.5 sec., the porcelain housing was not damaged. The above porcelain housing had an inner diameter of 100 mm and a height of 460 mm. If a material having excellent arc-resistive material is not be used from the standpoint of explosion-proof effect, the arc resistance may be improved by forming a third layer by lining a material having excellent arc-resistance on the inner surface of the second layer.

Further, although the present invention is directed to the explosion-proof porcelain housings for use in the gas-filled insulating apparatuses, they can be used for oil-insulated type insulating apparatuses by lining the porcelain housing body with a material having excellent oil-resistance. In this manner, industrial application of the present invention can be widened by employing the multilayer lining structure.

The present invention can be modified in actual uses.

(1) In the above examples, the polyurethane resins are used as the materials for forming the films. However, various other rubbery materials may be used such as natural rubber, silicon rubber, and butyl rubber, or various resins such as ionomer resin, polypropylene, polyethylene, ethylene-vinyl acetate copolymer, and styrene-butadiene resin, and FR materials in which fibers are mixed into such rubbery materials or resins to raise strength.

(2) When a material having excellent adhesion to the porcelain of the porcelain housing body is used for the first film, the first film may be directly lined onto the inner surface of the porcelain housing body without interposing any adhesive between the porcelain and the first film. On the other hand, if bonding strength between the first film and the second film is insufficient, an appropriate adhesive may be used.

As having been explained above, even if the porcelain housing according to the present invention is broken, broken pieces of the porcelain housing can be prevented from being scattered by effectively combining the first and second films having different properties. Further, according to the process for producing the porcelain housing in the present invention, the above-mentioned explosion-proof porcelain housings can be easily produced.

Therefore, the present invention can greatly contribute to the industrial development of explosion-proof porcelain housings for the gas-filled insulating apparatus and to the producing process thereof in that the invention solves problems with the conventional devices.

What is claimed is:

1. An explosion-proof porcelain housing for use in a gas-filled insulating apparatus, said explosion-proof porcelain housing comprising a porcelain housing body, an adhesive film formed on an inner surface of said porcelain housing body, a first film bonded to said inner surface of said porcelain housing body via said adhesive film, and a second film bonded to said first film, wherein said first film comprises a first insulating material having high elasticity, and said second film comprises a second insulating material having high mechanical strength and a higher hardness than the hardness of said first insulating material.

2. The explosion-proof porcelain housing of claim 1, wherein hardness and elongation of the first film are 55–80 and not less than 400%, respectively, and hardness and tensile strength of the second film are 85–95 and not less than 150 $kgf/cm^2$, respectively.

3. The explosion-proof porcelain housing of claim 1, wherein the hardness of the first film is lower than that of the second film by about 20 to about 30.

4. The explosion-proof porcelain housing of claim 1, wherein a thickness of the first film is about 1 mm to 2 mm.

5. The explosion-proof porcelain housing of claim 1, wherein an inner diameter of the porcelain housing body is not more than about 150 mm, and tensile strength of the second film is not less than 150 $kgf/cm^2$.

6. The explosion-proof porcelain housing of claim 1, wherein an inner diameter of the porcelain housing body is not less than about 200 mm, and the tensile strength of the second film is not less than 400 $kgf/cm^2$.

7. The explosion-proof porcelain housing of claim 1, wherein the second film is made of an arc-resistive material.

8. The explosion-proof porcelain housing of claim 1, wherein an inner surface of the second film is lined with an arc-resistive material.

9. The explosion-proof porcelain housing of claim 1, wherein the first and second films are made of materials selected from the group consisting of polyurethane resin, natural rubber, silicon rubber, butyl rubber, ionomer resin, polypropylene, polyethylene, ethylene-vinyl acetate copolymer, styrene-butadiene resin, and fiber-reinforced materials thereof.

* * * * *